(12) United States Patent
Joedicke et al.

(10) Patent No.: US 11,226,432 B2
(45) Date of Patent: Jan. 18, 2022

(54) HYPERBRIGHT WHITE ROOFING GRANULES WITH HIGH SOLAR REFLECTANCE

(71) Applicant: Specialty Granules Investments LLC, Parsippany, NJ (US)

(72) Inventors: Ingo B. Joedicke, Falling Waters, WV (US); Derek J. Small, Mercersburg, PA (US); Wade O. Kemp, III, Shippensburg, PA (US)

(73) Assignee: Specialty Granules Investments LLC, Parsippany, NJ (US)

( * ) Notice: Subject to any disclaimer, the term of this patent is extended or adjusted under 35 U.S.C. 154(b) by 0 days.

(21) Appl. No.: 16/675,020

(22) Filed: Nov. 5, 2019

(65) Prior Publication Data

US 2020/0064517 A1 Feb. 27, 2020

Related U.S. Application Data

(63) Continuation of application No. 14/409,437, filed as application No. PCT/US2013/046629 on Jun. 19, 2013, now abandoned.

(60) Provisional application No. 61/764,301, filed on Feb. 13, 2013, provisional application No. 61/661,637, filed on Jun. 19, 2012.

(51) Int. Cl.
| | |
|---|---|
| *G02B 1/02* | (2006.01) |
| *D06N 5/00* | (2006.01) |
| *E04D 7/00* | (2006.01) |
| *C04B 35/626* | (2006.01) |
| *C04B 38/00* | (2006.01) |
| *C04B 35/63* | (2006.01) |
| *C04B 33/14* | (2006.01) |
| *C04B 35/628* | (2006.01) |
| *B29C 48/04* | (2019.01) |
| *B05D 3/00* | (2006.01) |
| *E04D 1/00* | (2006.01) |
| *C04B 111/00* | (2006.01) |

(52) U.S. Cl.
CPC .............. *G02B 1/02* (2013.01); *B05D 3/002* (2013.01); *B29C 48/04* (2019.02); *C04B 33/14* (2013.01); *C04B 35/62695* (2013.01); *C04B 35/62807* (2013.01); *C04B 35/6316* (2013.01); *C04B 38/009* (2013.01); *D06N 5/003* (2013.01); *E04D 1/00* (2013.01); *E04D 7/005* (2013.01); *C04B 2111/00586* (2013.01); *C04B 2235/3201* (2013.01); *C04B 2235/3206* (2013.01); *C04B 2235/3208* (2013.01); *C04B 2235/3215* (2013.01); *C04B 2235/3217* (2013.01); *C04B 2235/3232* (2013.01); *C04B 2235/3272* (2013.01); *C04B 2235/3284* (2013.01); *C04B 2235/349* (2013.01); *C04B 2235/3418* (2013.01); *C04B 2235/3427* (2013.01); *C04B 2235/3463* (2013.01); *C04B 2235/6021* (2013.01); *C04B 2235/6562* (2013.01); *C04B 2235/6565* (2013.01); *C04B 2235/72* (2013.01); *C04B 2235/80* (2013.01); *C04B 2235/96* (2013.01); *C04B 2235/9607* (2013.01); *E04D 2001/005* (2013.01); *Y02A 30/254* (2018.01); *Y02B 80/00* (2013.01); *Y10T 428/24413* (2015.01)

(58) Field of Classification Search
CPC ......... B05D 3/002; B29C 48/04; C04B 33/14; C04B 35/62695; C04B 35/62807; C04B 35/6316; C04B 38/009; D06N 5/003; E04D 1/00; E04D 7/005; Y10T 428/24413; Y02A 30/254; G02B 1/02
See application file for complete search history.

(56) References Cited

U.S. PATENT DOCUMENTS

| | | | | |
|---|---|---|---|---|
| 5,240,760 | A * | 8/1993 | George | B01J 2/006 428/145 |
| 7,641,959 | B2 * | 1/2010 | Joedicke | C09C 1/0009 428/145 |
| 2003/0152747 | A1 * | 8/2003 | Fensel | B32B 11/10 428/143 |
| 2004/0258835 | A1 * | 12/2004 | Hong | E04D 13/002 427/180 |
| 2008/0241516 | A1 * | 10/2008 | Hong | E04D 7/005 428/331 |
| 2010/0104809 | A1 * | 4/2010 | Duda | C09D 7/61 428/143 |
| 2010/0203336 | A1 * | 8/2010 | Shiao | C04B 33/14 428/404 |
| 2011/0086201 | A1 * | 4/2011 | Shiao | C03C 10/00 428/148 |

OTHER PUBLICATIONS

Dondi et al, "The vitreous, phase of porcelain stoneware: Comp., evol. during sintering and phys. prop" Elsevier, 2011, Journal of Non-Crystalline Solids, Issue 357, pp. 3251-3260 (Year: 2011).*

* cited by examiner

*Primary Examiner* — Maria V Ewald
*Assistant Examiner* — Ethan Weydemeyer
(74) *Attorney, Agent, or Firm* — Greenberg Traurig, LLP

(57) ABSTRACT

The invention provides a bright white refractory roofing granule, comprising a ceramic material formed from a substantially homogenous mixture of a ceramic-forming clay, sintering material, and optionally comprising silica particles, and other potential additives, said bright white refractory roofing granule having a total solar reflectance of at least 0.80 and a Hunter Color Lvalue of at least 85.0, together with processes for making and using the same.

20 Claims, No Drawings

HYPERBRIGHT WHITE ROOFING GRANULES WITH HIGH SOLAR REFLECTANCE

CROSS REFERENCE TO RELATED APPLICATIONS

This application is a continuation of U.S. application Ser. No. 14/409,437, filed Dec. 18, 2014, which is a United States Application under 35 USC § 371 claiming benefit of PCT/US2013/046629, filed Jun. 19, 2013, which claims priority to U.S. Provisional Application 61/661,637, filed Jun. 19, 2012, as well as U.S. Provisional Application 61/764,301, filed Feb. 13, 2013, the entire contents of each of which are incorporated by reference herein.

FIELD

The present invention pertains to the fields of roofing materials and of ceramic materials, more particularly to high-reflectance ceramic materials containing clay, silica particles, sintering aids and roofing granules made therefrom.

BACKGROUND OF THE INVENTION

Due to increased interest in energy conservation, the USEPA has developed standards under its Energy Star® program for increased magnitude and retention of solar reflectance of roofing materials. A greater reflectance leads to less heat absorption by roofing materials and lowered temperature control costs for buildings. The most common roofing materials comprise substrates of asphalt and/or modified bitumen which themselves are black in color and have very low solar reflectance. Most of these roofing materials are provided with a granular coating to reduce weathering, provide esthetics, and add fire resistance. Many of the granular materials used, such as artificially-colored crushed rock, are dark in color and also have low solar reflectance.

Reflective semi-ceramic coatings have been used to increase the reflectivity of conventional roofing granules. However, the manufacture of very white roofing granules having high solar reflectance (also referred to as "bright white" or "hyperbright white" granules) by using conventional silicate/clay coating processes on standard base rock is impractical and cost-prohibitive. The coating cannot be cost-effectively pigmented or applied to completely shield the underlying base rock and provide a granular Total Solar Reflectance (TSR) requirement of at least 0.80. This granular reflectance is targeted to assure that, after application of the granules to the asphalt or modified bitumen substrate, the final roofing product reflectance is equal to or greater than 0.65, in conformance to Low-Slope Energy Star® standards. This will also help satisfy the proposed California Title 24 low-slope 3-year aged solar reflectance requirement of 0.63.

SUMMARY

An embodiment of the present invention comprises a bright white synthesized refractory that has a very high solar reflectance. In such an embodiment of the present invention, the bright white refractory is synthesized from ceramic raw materials. No colored coating is involved.

Another embodiment of the present invention comprises hyperbright white granules made from the bright white refractory. In a further embodiment the invention comprises methods for producing hyperbright white granules made from the bright white refractory. A further embodiment comprises methods for producing hyperbright white granules further comprising a pelletization or granulation process to first produce granular particles of roofing granule size that are subsequently processed to the bright white refractory.

A further embodiment of the present invention comprises roofing materials that are at least partially covered with the hyperbright white granules rather than the artificially-colored rock base normally used. The roofing granules of embodiments of the present invention are bright white throughout their entire structure (inside and out), rather than only having a white coating.

Yet another embodiment comprises a roofing system comprising the hyperbright white granules for use in the upper layer.

A further embodiment comprises a method for reducing the heat absorption of a roof comprising installing a roofing system comprising the hyperbright white granules. In one embodiment the roofing system comprises the hyperbright white granules as a top layer on a roof. For example, this embodiment may comprise replacing or covering existing roofing top layer or including in an original installation.

Further embodiments of the present invention are described below, in the description, examples and claims.

DETAILED DESCRIPTION

In one embodiment the present invention provides Process-1, wherein Process-1 is a process for making granules comprising:
 i.) forming a mixture comprising clay (e.g. kaolin clay), sintering material, e.g., feldspar, and optionally one or more additional ingredients selected from silica particles, pigment, fillers, lightening agents, porosity enhancers, and mixtures thereof;
 ii.) optionally forming the mixture into aggregate by extrusion, pelletization, or granulation prior to firing
 iii.) firing the mixture for a time and temperature sufficient to vitrify the sintering agent but not the clay, to obtain a conglomerate;
 iv.) further reducing the conglomerate thus formed into granules, as needed (e.g., breaking the conglomerate into granules);
 v.) applying a post treatment coating, e.g., an oil-based or aqueous post-treatment coating to control dust, reduce staining, and enhance adhesion to asphalt (e.g., coating the granules with an oil).
For example, Process-1 also includes:
 1.1 Process-1 wherein the sintering material is feldspar
 1.2 Any of the aforementioned processes wherein the firing temperature is between about 1000° C. to about 1500° C. (e.g., at about 1250° C.) and wherein the firing is done using a suitable heating device e.g., a rotary kiln, tunnel kiln, periodic kiln, muffle furnace, microwave assisted kiln, or other suitable heating device.
 1.3 Any of the aforementioned processes wherein the firing temperature is between about 1000° C. to about 1400° C. (e.g., at about 1250° C.) and wherein the firing is done using a suitable heating device e.g., a rotary kiln, tunnel kiln, periodic kiln, muffle furnace, microwave assisted kiln, or other suitable heating device.
 1.4 Any of the aforementioned processes wherein the firing time is about 2 hrs. (e.g., about 1 hrs, 1.25 hrs, 1.5 hrs., 2 hrs, 2.25 hrs., 2.5 hrs., 2.75 hrs., 3 hrs.)

1.5 Any of the aforementioned processes wherein the process further comprises pelletizing or granulating the granules prior to firing.

1.6 Any of the aforementioned processes wherein the mixture of step (i) comprises white pigment, e.g. selected from white materials that are color-stable at high temperatures, e.g., selected from titanium dioxide, magnesium oxide, barium sulfate, zinc oxide, and mixtures thereof.

1.7 Any of the aforementioned processes wherein the mixture of step (i) comprises a filler and lightening agent, e.g., selected from finely ground silica, alumina, talc, gypsum, and mixtures thereof.

1.8 Any of the aforementioned processes wherein the mixture of step (i) optionally comprises a porosity enhancer, e.g., carbon black, charcoal dust, wood/walnut shell powder, or a powdered combustible that will oxidize during firing to create voids in the refractory matrix to enhance porosity and, as a result, increase reflectance.

1.9 Any of the aforementioned processes wherein the clay of step (i) is a white clay, e.g., selected from kaolin, ball clay, montmorillonite, or combinations thereof, and wherein the clay is optionally wholly or partially calcined.

1.10 Any of the aforementioned processes wherein the sintering agent is selected from calcium hydroxide, sodium carbonate, sodium bicarbonate, sodium silicate, feldspar, nephaline syenite, and mixtures thereof.

1.11 Any of the aforementioned processes wherein the components of step (i) are mixed with water, e.g., in a pug mill, to produce a homogeneous and uniformly dampened mass.

1.12 The process of 1.11 wherein the homogeneous and uniformly dampened mass is subsequently extruded through a die or a screen to produce fragments or strips of green refractory material ("green" referring here to the fact that the material has not yet been fired at high temperatures, not to its color)

1.13 The process of 1.12 wherein the green refractory material can be predried at a time and temperature sufficient to reduce the internal moisture of the mixture to about 1% to about 5% for a period of 6-18 hours, e.g., overnight, e.g., at elevated temperature (e.g., at temperatures from about 140° F. to about 180° F. (e.g., about 60° C. to about 80° C., e.g., at about 160° F. or about 70° C.), 1.14 Any of the foregoing processes wherein the firing time and temperature of step (ii) to vitrify the sintering agent but not the clay is at a temperature in the range of about 1000° C. to about 1500° C. (e.g., at about 1250° C.) for about 1 to about 3 hours, e.g., about 2 hours.

1.15 Any of the foregoing processes wherein the firing time and temperature of step (ii) to vitrify the sintering agent but not the clay is at a temperature in the range of about 1000° C. to about 1400° C. (e.g., at about 1250° C.) for about 1 to about 3 hours, e.g., about 2 hours.

1.16 The process of 1.12 or 1.13 wherein the green refractory material is sintered by firing at a temperature range of about 1000° C. to about 1500° C. (e.g., at about 1250° C.) for about 1 to about 3 hours, e.g., about 2 hours.

1.17 The process of 1.12 or 1.13 wherein the green refractory material is sintered by firing at a temperature range of about 1000° C. to about 1400° C. (e.g., at about 1250° C.) for about 1 to about 3 hours, e.g., about 2 hours.

1.18 Any of the aforementioned processes wherein the conglomerate produced by step (ii) is crushed and screened (e.g., either before or after the conglomerate is cooled to ambient temperature), to a desired size (e.g. $d_{50}$ of 0.5-2 mm, e.g., about 1 mm, e.g., Grade 11 size granules, e.g. as measured in accordance with ASTM D451-91, e.g., a grading suitable for use as a granular coating for a roofing membrane (e.g., an asphalt or modified bitumen roofing membrane).

1.19 Any of the aforementioned processes, comprising placing the dry materials of step (i) in a rotary pelletizer and gently spraying them with water or a dilute sodium silicate solution, to form pellets.

1.20 The process of any of the aforementioned processes, wherein the pellets thus formed are subsequently subjected to high temperature firing, in accordance with step (ii).

1.21 The process of any of the aforementioned processes wherein the oil of step (iv) is selected from aqueous polysiloxane, polymer emulsions, and mixtures thereof, 1.22 The process of any of the aforementioned processes wherein the final product has a total solar reflectance of at least 0.80 and a Hunter Color L-value of at least 87.0

1.23 The process of any of the aforementioned processes wherein the final product has a total solar reflectance of at least 0.80 and a Hunter Color L-value of at least 85.0

1.24 Any of the aforementioned processes, further comprising placing the dry materials of step (i) in a roll compactor to compress the components into a solid mass that is subsequently broken into granule-sized aggregate particles.

1.25 The process of 1.24, wherein dry materials of step (i) are optionally first dampened with water or an aqueous binder solution (e.g. sodium silicate).

1.26 The process of 1.24 or 1.25, wherein the compressed granules thus formed are subsequently subjected to high temperature firing, in accordance with step (iii).

1.27 The process of any of the aforementioned processes wherein the post treatment of step (v) comprises a mixture of Process Oil and Polysiloxane.

1.28 The process of any of the aforementioned processes wherein the post treatment coating of step (v) is selected from aqueous polysiloxanes, polymer emulsions, and mixtures thereof.

1.29 The process of any of the aforementioned processes, wherein the process includes a solidifying step following step (i.), wherein the solidifying step includes solidifying the mixture by means of compaction, extrusion, or pelletization.

1.30 The process of any of the aforementioned processes, wherein the resulting granule has a composition comprising Mullite 25-75%, Quartz 5-25%; Cristoballite 0-3%), and Amorphous/Other 10-55%, e.g., as measured by Crystal Phase X-Ray Diffraction.

1.31 The process of any of the aforementioned processes, wherein the resulting granule has a composition comprising A1203 20-50%; SiO2 40-80%; Fe203 0-1%; and other components 0-10%, e.g., as measured by X-Ray Fluorescence.

1.32 The process of any of the aforementioned processes, wherein the resulting granule has no detectable fibrous mineral components as determined by a 1000 point count (EPA method 600/R-93/1 16).

1.33 The process of any of the aforementioned processes, wherein the resulting granule has a porosity (as determined by Mercury Intrusion) of between 20%>-50%>.

1.34 The process of any of the aforementioned processes, wherein the resulting granule has an overall crystallinity of 30%>-60%>, e.g., comprising 25%-40% Mullite, 5%-15%, Quartz, 0%-7.0% Cristobalite.

In another embodiment the present invention provides for "hyperbright" white roofing granules (Granule 2), i.e., bright white refractory roofing granules comprising a ceramic material formed from a substantially homogenous mixture of a ceramic-forming clay, sintering material, and optionally comprising silica particles and/or other additives, e.g.

2.1. Granule 2 wherein said granules have a total solar reflectance of at least 0.80 and a Hunter Color L-value of at least 87.0.

2.2. Granule 2 wherein said granules have a total solar reflectance of at least 0.80 and a Hunter Color L-value of at least 85.0.

2.3. Any of the preceding Granules-2, et seq., wherein said granules have a translucency of 5%> or less, e.g., 1% or less.

2.4. Any of the preceding Granules-2, et seq. having a Barrett Hardness value of at least 70, e.g. at least 75, e.g., at least 85.

2.5. Any of the preceding Granules-2, et seq. having a thermal emittance of at least 0.8, e.g., at least 0.85.

2.6. Any of the preceding Granules-2, et seq. having a stain potential of 4 or less, e.g., wherein stain potential is a relative measure of degradation of the whiteness and/or reflectance of the roofing granules caused by the absorption of asphaltic oils, determined by surfacing a designated asphalt substrate with roofing granules and exposing it to elevated temperatures, determined on a scale of 0-10 (e.g., none to excessive) by comparison with reference standards.

2.7. Any of the preceding Granules-2, et seq. further comprising a post treatment coating (e.g., an oil coating) e.g., a post treatment coating selected from selected from: i.) a mixture comprising process oil and polysiloxane, or from ii.) aqueous polysiloxane, iii.) polymer emulsions, and/or iv.) mixtures thereof.

2.8. Any of the preceding Granules-2, et seq. when produced by any of the processes of Process A.

2.9. Any of the preceding Granules-2, et seq. when manufactured by a high-temperature sintering of a ceramic mixture containing clay, optionally ground particulate silica, and one or more components commonly referred to as "sintering aids".

2.10. Any of the preceding Granules-2, et seq. when produced using a ceramic mixture comprising clay and one or more of the following components: (1) a white pigment such as titanium dioxide, magnesium oxide, barium sulfate, zinc oxide, or other materials that are color-stable at high temperatures; (2) a filler and lightening agent such as finely ground silica, alumina, talc, or gypsum; and (3) a sintering aid which is a fusible binder selected from calcium hydroxide, sodium carbonate, sodium bicarbonate, sodium silicate, feldspar, nephaline syenite, and mixtures thereof, and (4) a porosity enhancer selected from carbon black powdered carbon, powdered wood, or other combustible powdered materials, and mixtures thereof.

2.11. Any of the preceding Granules-2, et seq. when produced using a ceramic mixture comprising 70-80% e.g., about 75% white clay; 10-20%, e.g., about 15% silica; and 5-15%), e.g., about 10%> sintering aids selected from calcium hydroxide, feldspar nephaline syenite, and mixtures thereof.

2.12. Any of the preceding Granules-2, et seq. when produced using a ceramic mixture comprising 50-85% e.g., about 75% white clay; 10-30%, e.g., about 15% silica; and 0-25% o, e.g., about 10.4> sintering aids selected from calcium hydroxide, feldspar nephaline syenite, and mixtures thereof.

2.13. Any of the preceding Granules-2, et seq. when coated with an oil-based post treatment coating (e.g., a coating comprising process oil and polysiloxane), e.g. in an amount of 0.05-0.1% of oil by weight of the granules, e.g., 1-2 lbs per ton.

2.14. Any of the preceding Granules-2, et seq. when coated with an oil-based post treatment coating, wherein the post treatment coating comprises process oil and polysiloxane, e.g. in the amount of 5-10 lbs per ton of oil (i.e. 0.25-0.50%> by weight of granules) and 0.1-0.5 lbs per ton of polysiloxane, (i.e. 0.005-0.025% by weight of granules).

2.15. Any of the preceding Granules-2, et seq. when coated with an aqueous post treatment, wherein the aqueous post treatment coating comprises a polysiloxane emulsion, e.g. in an amount of 0.25-0.50%> of emulsion solids by weight of the granules, e.g., 5-10 lbs per ton.

2.16. Any of the preceding Granules-2, et seq. having a composition comprising Mullite 25-75%, Quartz 5-25%; Cristoballite 0-5%, and Amorphous/Other 10-55% o, e.g., as measured by Crystal Phase X-Ray Differaction.

2.17. Any of the preceding Granules-2, et seq. having a composition comprising $Al_2O_3$ 20-50%; $SiO_2$ 40-80%; $Fe_2O_3$ 0-1%; and other components 0-10%, e.g., as measured by X-Ray Fluorescence.

2.18. Any of the preceding Granules-2, et seq. having no detectable fibrous mineral components as determined by a 1000 point count (EPA method 600/R-93/1 16).

2.19. Any of the preceding Granules-2, et seq. having a porosity (as determined by Mercury Intrusion) of between 20%-50%.

2.20. Any of the preceding Granules-2, et seq. having an overall crystallinity of 30%-60%, e.g., comprising 25%-40% Mullite, 5%-15%, Quartz, 0%-7.0% Cristobalite.

The combination of raw materials and processing conditions in certain embodiments of the present invention creates a very white and reflective refractory that is opaque to visible and ultraviolet light, and is both durable and stain-resistant. When used to coat conventional roofing substrates the refractory can be crushed and screened to produce bright white granules that are suitable for use as roofing granules.

In certain embodiments these roofing granules (Granules-2, et seq.) can also be made by pelletizing or granulating the refractory raw material mixture with suitable equipment and processing via heat treatment to the desired refractory product, thereby eliminating the need for size reduction and separation. The resulting hyperbright white roofing granules resist wicking of asphalt or bitumen from the underlying roofing membrane, thereby preserving the high reflectance of the granules.

In an exemplary embodiment of the present invention, the refractory raw material mixture (e.g., the materials of step (i) of Process-1 above) comprises kaolin clay, optionally particulate silica, a sintering aid selected from calcium hydroxide, sodium carbonate, sodium bicarbonate, feldspar, nephaline syenite, or mixtures thereof, and optionally zinc oxide and/or other porosity enhancers. A useful formula for the refractory is as follows (all percentages by total weight of the dry mixture of raw materials):

| | |
|---|---|
| (i) Kaolin clay | 40-80%; |
| (ii) Particulate silica | 0-40%; |
| (iii) Sintering aids | 10-40%, e.g., comprising one or more of the following components by weight of the dry mixture of raw materials |
| Calcium hydroxide | 0-10%>; |
| Sodium carbonate | 0-10%>; |
| Feldspar | 0-25%; |
| Nephaline Syenite | 0-25%; and |
| (iv) Zinc oxide | 0-5% by weight. |

In another embodiment, a useful formula for the refractory is as follows (all percentages by total weight of the dry mixture of raw materials):

| | |
|---|---|
| (i) Kaolin clay | 50-85%; |
| (ii) Particulate silica | 10-30%; |
| (iii) Sintering aids | 0-25%, e.g., comprising one or more of the following components by weight of the dry mixture of raw materials |
| Calcium hydroxide | 0-10%; |
| Sodium carbonate | 0-10%; |
| Feldspar | 0-25%; |
| Nephaline Syenite | 0-25%; |
| (iv) Zinc oxide | 0-5% and |
| (v.) Porosity Enhancer | 0-5% by weight. |

A suitable kaolin clay is KT Mercer Kaolin Clay (Kentucky-Tennessee Clay Company, Langley, S.C.). Other clays may be used in place of or in combination with kaolin clay. Such clays should be selected from those that are very white, low in iron, and can be fired to a hard, durable refractory that will withstand weather exposure. Such clays may include, but are not necessarily limited to, ball clays, montmorillonites, and calcined clays. A person of ordinary skill in arts related to ceramics manufacture should, given the disclosure of the present application, be able to select suitable clays and processing conditions through ordinary experimentation.

A suitable particulate silica is Unimin Silverbond 325 Silica (Unimin Corporation, New Canaan, Conn.). The aforesaid silica is graded to the particulate fraction passing through a 325 mesh sieve. This equates to a maximum particle size of 44 microns. The use of silica having smaller particle sizes (e.g., 5 microns and smaller) may result in a bright white refractory having a higher reflectance than that of the exemplary formulation provided above. However, the hardness and opacity are expected to be lower.

A suitable feldspar is Minspar 200 from The KT Feldspar Corporation. This is a −200 mesh floatation grade soda feldspar commonly used in the ceramic whiteware industry.

A suitable nephaline syenite is Minex 4 from Unimin Corporation. This is a −325 mesh mineral complex of Albite, Microcline, and Nephaline with median particle size 6.8 microns.

Calcium hydroxide, sodium carbonate, sodium bicarbonate, sodium silicate, talc, gypsum, and zinc oxide, as well as other fusible binders and white mineral pigments, and porosity enhancers are commodity chemicals available in many grades of purity and are available from numerous sources. Commercial grades are sufficient for use in the present invention as long as they do not include any non-oxidizable darkening impurities. Any impurities that darken permanently when heated in the range of about 1000° C. to about 1500° C. (e.g., in a range about 1000° C. to about 1400° C.) may reduce the whiteness and reflectance of the finished refractory. Examples of such impurities include organic substances and various iron compounds.

Materials that may be substituted for calcium hydroxide include calcium carbonate. Both calcium hydroxide and calcium carbonate decompose to calcium oxide during firing. Without being bound by theory, it is believed that calcium oxide ultimately reacts with silica to form inert calcium silicate. However, it should be noted that calcium oxide should not be used as a starting material in place of calcium hydroxide. This is because calcium oxide reacts with water used to dampen the clay mixture during manufacturing, resulting in swelling, cracking, and loss of refractory hardness. Without being bound by theory, it is believed that sodium carbonate reacts with the silica/clay components to form sodium silicate and insoluble aluminosilicates. In this way, Again, without being bound by theory, it is believed that sodium carbonate in the refractory composition migrates to the outside surface of the refractory body during firing, resulting in the formation of a "glaze".

Materials that may be substituted for zinc oxide include zinc hydroxide or zinc carbonate. These materials are also white and decompose to zinc oxide during high-temperature firing. Other whitening pigments may be suitable if they maintain their whiteness at the temperatures used to fire the refractory. Besides being suitable whitening pigments for embodiments of the present invention, zinc compounds have algicidal properties that may also help to preserve the whiteness of the refractory.

Porosity Enhancers include combustibles that "burn out" during high temperature firing to produce microvoids that enhance the scattering of light and, hence, increase overall reflectance. Suitable porosity enhancers include carbon black, other fine particle-size carbons, wood dust, ground walnut shells and other similar materials used for this purpose and known in ceramic processing technology.

The bright white refractory of certain embodiments of the present invention may be formed by the process described herein. Kaolin clay, silica particles, sintering aids (such as calcium hydroxide, sodium carbonate, feldspar, nephaline syenite, or mixtures thereof) and optionally zinc oxide or other whitening pigments, and porosity enhancers are mixed together and the mixture is dampened with about 15-25% water by weight of dry clay, and worked to form a damp dough-like mass. Best results may be obtained when the kaolin clay, silica, sintering aids, and whitening pigments are provided as powders.

In one embodiment the dough-like mass is forced through a coarse screen (e.g., an 8 mesh screen, followed by a 10 mesh screen) as many times as needed to assure complete and uniform wetting of the powdered components. A portion of the mixture is placed in a die and is formed into a disc at a pressure of about 1-8 tons per square inch. Suitable compression equipment is known in the industry and may be selected according to the scale of the manufacturing process. For example, about 150 grams of the mixture may be formed into a ½-inch thick by 3 inch diameter disc using a hydraulic press. The compressed disc is predried overnight at about 160° F. (about 70° C.) or as needed to reduce the internal moisture of the mixture to about 1-5%, and then sintered by firing at a temperature in the range of about 1000° C. to about 1500° C. (e.g., in the range of about 1000° C. to about 1400° C.), (e.g., at about 1250° C.) for about 2 hours, thereby producing a durable bright white refractory solid. The refractory solid may then be crushed and screened to a desired grading suitable for use as a granular coating for a roofing membrane (e.g., an asphalt or modified bitumen roofing membrane).

In another embodiment, the dry components and water are mixed in a pug mill to produce a homogeneous and uniformly dampened mass that is subsequently extruded through a die to produce thin rods or strips of "green refractory". As before, the green refractory material can be predried overnight at about 160° F. (about 70° C.) or as needed to reduce the internal moisture of the mixture to about 1-5%, and then sintered by firing at a temperature in the range of about 1000° C. to about 1500° C. (e.g., in the range of about 1000° C. to about 1400° C.), (e.g., at about 1250° C.) for about 2 hours, thereby producing a bright white refractory solid. The refractory solid may then be crushed and screened, either before or after the refractory is cooled to ambient temperature, to a desired grading (e.g. No. 11) suitable for use as a granular coating for a roofing membrane (e.g., an asphalt or modified bitumen roofing membrane).

In a further embodiment, the dry components are placed in a rotary pelletizer and gently sprayed with water (or a dilute sodium silicate solution) to produce round "green refractory" particles. As the dampened particles roll in the dry refractory mix, they pick up progressively more solid and increase in size. The size of these particles can be controlled by the length of time in the pelletizer and the amount of spraying used. Granules that discharge from the pelletizer are round but irregular in shape, and of broad size distribution. Granules that are too small can be returned to the pelletizer. Granules that are too large can be easily broken down and the fragments also returned to the pelletizer. This results in a granule-making process with no waste. Subsequent high temperature firing produces the desired hyperbright white refractory granules. If Sodium Carbonate is present in the component mix that is formed into pellets, a self-glazing effect is obtained during the firing process. This effectively seals the pellet surface to produce a "closed" porosity whereby the resulting granules are still bright white and hard, but exhibit significantly reduced absorption of oils and fewer tendencies to stain.

In yet a further embodiment, the dry components are placed in a roller compactor and compressed to a hard solid mass, which is subsequently broken down into sized granular aggregate by means of suitable crushing and screening equipment. Once the screening equipment has been adjusted to produce the desired granule size distribution, oversize material can be returned to the crusher, and undersize returned to the roller compactor, so there is no loss of product yield. Instead of spherical pellets, this process produces irregular/angular "green refractory" particles which, after firing at a temperature in the range of about 1000° C. to about 1400° C. (e.g., at about 1250° C.) for about 2 hours, produces bright white refractory granules requiring no further crushing or sizing.

Firing of the "green refractory" material may be accomplished by using either a suitable heating device, e.g., a rotary kiln, tunnel kiln, periodic kiln, muffle furnace, microwave assisted kiln, or other suitable heating device.

The procedures described above are suitable for manufacturing hyperbright white roofing granules according to embodiments of the present invention. Persons skilled in the relevant arts and having possession of the present disclosure will recognize that modifications to the foregoing process may be required in the interest of efficient and cost-effective manufacturing practices to produce the hyperbright white roofing granules at larger scales. Such modifications may be developed using generally known ceramics engineering and processing techniques.

A further step that may be performed after crushing or pelletizing, or granulating the refractory solid would be to post-treat the fired, finished hyperbright white granules with agents to control dust, impart water repellency, reduce asphaltic staining and/or to improve adhesion to the asphalt or modified bitumen substrate. Post-treatments for conventional roofing granules include application of process oil and polysiloxane. Process oil can be suitable but is not considered ideal in this application since it tends to, in some cases, darken roofing granules. Substitute materials, such as aqueous polysiloxane and/or suitable polymer emulsions, may be applied to the hyperbright white roofing granules with less detrimental impact on their whiteness and/or reflectance. Optimum post-treatment methods and materials may be developed through routine experimentation as performed by those persons having ordinary knowledge of the relevant arts.

In a further embodiment the present invention provides for an asphalt roofing material (Material-3) comprising (i) any of Granules A, et seq, attached to (ii) a base material comprising a nonwoven mat (e.g. comprising paper, felt, resin, fiberglass or glass fiber), coated and/or impregnated with asphalt, e.g., in the form of a shingle or sheet.

It is further contemplated that Material-3 may be:

3.1 Material-3 which is substantially waterproof.

3.2 Any of the preceding Materials wherein the Total Solar Reflectance (TSR) of the Material is at least 0.63, e.g., at least 0.65, e.g., at least 0.70.

3.3 Any of the preceding Materials wherein the thermal emittance is at least 0.75.

In a further embodiment, the present invention provides for a roofing system comprising any of Material-3, et seq. It is contemplated that in one embodiment, Material-3 provides the upper layer of said roofing system, for example, a roofing system comprising an asphalt roofing material Material-3 on top of a coverboard material, or on top of a pre-existing asphalt roofing material.

In yet another embodiment, the present invention provides for a method of reducing heat absorption of a roof, by covering a roof with any of Material-3, et seq. It is contemplated that in certain embodiments, said method includes installing the asphalt roofing material of Material-3 as the upper layer of an original roofing project. In another embodiment, the method of reducing absorption comprising using the asphalt roofing material of Material-3 to cover an existing roofing layer.

Critical performance parameters for the hyperbright white roofing granules according to embodiments of the present invention, and procedures that may be used to quantify them are as follows:

1) Hunter color, particularly the L-value, or "lightness", indicates how white a material is. The magnitude of the other Hunter color scales (i.e., the a-scale (green/red) and b-scale (blue/yellow)) indicate "off white" shades of color. It is desirable that the L-value be as close to 100 as possible. An L-value that is equal to or greater than 85.0 will generally provide a satisfactory level of reflectance for the purpose of the present invention. Any significant contribution by "a" or "b" will reduce the L-value and reflectance of the roofing granules. The a-scale values should be small and within the range of −1.5 to +1.0. The b-scale values should also be small and within the range of −5.0 and +15.0. Hunter color may be measured using any appropriate commercially-available instrumentation, such as a HunterLab LabScan XE colorimeter, and by following the instrument manufacturer's instructions.

2) Total solar reflectance indicates the portion of incident solar radiation reflected by the roofing granules. The extent to which solar radiation affects surface temperatures depends on the solar reflectance of the exposed surface. A solar reflectance of 1.00 (100% reflected) would mean no effect on surface temperature while a solar reflectance of 0.00 (none reflected, all absorbed) would result in the maximum effect. For the hyperbright white granules according to embodiments of the present invention, a total solar reflectance (TSR) equal to or greater than 0.80 is targeted in order to achieve a subsequent roofing product (e.g., a shingle or roll) reflectance of at least 0.65, e.g., at least 0.70. A roofing product having such a 3-year aged reflectance would meet current Energy Star® requirements for low-slope reflective roofing and proposed California Title 24 low-slope requirements. Solar reflectance may be measured using any relevant commercially-available instrumentation; such as a Devices and Services Model SSR-ER Solar Spectrum Reflectometer, and by following the instrument manufacturer's instructions. For example, TSR may be measured in accordance with ASTM CI549-09.

3) Thermal Emittance is the relative ability of a material surface to radiate absorbed heat. It is a scale factor, between 0 and 1, with the higher values corresponding to higher thermal emittance, i.e., less heat retained by the material. In general, metal surfaces have low thermal emittance and, thus, remain hot even if reflectance is high. Refractory materials and ceramics typically have high thermal emittance. Emittance requirements for roofing products under California Title 24 are 0.75 minimum for low-slope products. Thermal Emittance may be measured by means of commercially-available instrumentation, such as a Devices and Services Model AR Emissometer.

4) Translucency indicates the percent of sunlight that can pass through the roofing granules to the underlying asphalt or modified bitumen substrate. Sunlight, particularly in the ultraviolet range, can degrade the substrate and adversely affect the adherence of the roofing granules to the substrate. A translucency of less than or equal to 5% is desirable, as measured, for example, by ASTM Method D1866-79.

5) Barrett Hardness is a relative measure of the durability, or crush-resistance, of the granules. A Barrett Hardness value of equal to or greater than 70 is desirable for roofing granules. Methods for measuring Barrett Hardness are well-known in the mineral aggregate industry.

6) Stain Potential is a relative measure of degradation of the whiteness and/or reflectance of the roofing granules caused by the absorption of asphaltic oils. It is determined by surfacing a designated asphalt substrate with roofing granules and exposing it to elevated temperatures. Stain may be determined on a scale of 0-10 (e.g., none to excessive) by comparison with reference standards, which may be selected subjectively. Stain is generally related to the degree of granule porosity, with roofing granules that have higher porosities showing a greater degree of stain under a given set of test conditions. However, a consistent relationship between porosity and degree of stain may not always be present. Without being bound by theory, stain is believed to result from wicking of asphalt oils into the pores of the roofing granules. Staining is generally reduced by application of a polysiloxane in the post treatment. According to one subjectively-developed scale, a stain of less than or equal to 4 is desired. This scale is used in some of the examples discussed below.

7) Porosity is a measure of the void (i.e. empty) spaces within the refractory matrix and is expressed as a percentage of the total volume. Internal pores scatter incident light to provide opacity and reflectance. The more numerous the light-scattering voids, the higher the reflectance. Porosity is determined by Mercury Intrusion Porosimetry and, for the present invention, should be in the range of e.g., 20-50% for optimum reflectance and durability.

8) Crystalline silica exists in several forms, the most common of which are quartz (i.e. the particulate silica starting material), and cristobalite, with quartz being the most common form found in nature. If quartz is heated to more than 1450° C., it can change form to cristobalite. The OSHA PELs and MSHA Exposure Limits for cristobalite are one-half of the PEL for Quartz. Therefore, it is desirable to limit cristobalite formation to no more than 3% in the synthesized refractory. Likewise fibrous silicates, such as asbestoform minerals, should be absent. Quartz and cristobalite are identified by X-Ray Diffraction. Asbestiform minerals are quantitatively determined by EPA Method EPA/600/R-93/1 16 (1000 point count).

9) Iron compounds in the form of iron oxides, silicates, or ferro-titanium compounds can significantly darken (and yellow) the synthesized refractory thereby reducing reflectance. Therefore, iron content, as measured by X-Ray Fluorescence, should not exceed 1%.

10) "XRD" analysis as used herein refers to "X-Ray Diffraction". X-Ray Diffraction refers to the technique used to examine, e.g., the physico-chemical of a solid (e.g., the crystallinity of a granule).

11) "XRF" analysis as used herein refers to "X-Ray Fluorescence". X-Ray Fluorescence refers to the technique used to examine used for, e.g., elemental analysis and chemical analysis of a solid (e.g., the elemental analysis of a ceramic, e.g., a granule).

Example 1

The following example demonstrates the performance parameters of hyperbright white roofing granules according to one embodiment of the present invention. This example does not limit the scope of the invention, and many variations and modifications of the exemplary embodiment are within the scope of the invention.

A homogeneous mixture of 75% KT Mercer Clay, 15% Unimin Silverbond 325 Silica, and 10% Calcium Hydroxide (Fisher Reagent) is dampened with sufficient water to produce a pliable mass in accordance with the process described above. After compaction at 2000 psi in a hydraulic press, oven firing at 1250° C., and crushing/screening to No. 11 grading, the resulting hyperbright white granules shows the following test results:

Hunter Color L = 88.5
Hunter Color a = 0.4
Hunter Color b = 10.3
Solar Reflectance TSR = 0.845
Translucency = 0%
Barrett Hardness = 84.4
Stain = 2

Example 2

A formulation of 75% KT Mercer Clay, 15% Unimin Silverbond 325 Silica, and 10% Minex 4 Nephaline Syenite is mixed and wetted in a Peter Pugger Vacuum Deairing Power Wedger (Pug Mill) in accordance with the process described above. After vacuum exposure to remove all air from the homogenous compacted mass, this green refractory composition is extruded at high pressure using a Peter Pugger Power Extruder fitted with an extrusion plate perforated with ⅜" holes. The emerging rods of green composition are cut into 2-4 inch long segments and allowed to air-dry overnight. The segments are then oven-fired in a commercial tunnel kiln with the following heating profile:

```
260° C. to 483° C. - 7.5 hrs
483° C. to 705° C. - 1.5 hrs
705° C. to 816° C. - 1.5 hrs
816° C. to 955° C. - 1.5 hrs
955° C. to 1039° C. - 1.5 hrs
1039° C. to 1133° C. - 1.5 hrs
1122° C. to 1150° C. - 3.0 hrs
1150° C. to 1122° C. - 1.5 hrs
1122° C. to 844° C. - 1.5 hrs
844° C. to 371° C. - 1.5 hrs
371° C. to 93° C. - 1.5 hrs
```

After cooling to room temperature the refractory product is crushed and screened to No. 11 grading and then post-treated with Wacker BS-16 Siloxane Emulsion at a rate of 1.5 pounds per ton (100% solids basis). The resulting hyperbright white granules show the following test results:

```
Hunter Color L = 89.5
Hunter Color a = -0.4
Hunter Color b = 7.1
Solar Reflectance TSR = 0.836
Thermal Emittance = 0.87
Translucency = 0
Barrett Hardness = 89.5
Stain = 2
Porosity = 43.0%
XRD Analysis:

Mullite = 30.1%
Quartz = 12.6%
Cristobalite = 2.7%
Amorphous/Other = <54.6%>
XRF Analysis:

Al₂O₃ = 34.8%
SiO₂ = 61.1%
Fe₂O₃ = 0.3%
Other = 3.8%
Fibrous Minerals: None Detected
```

Example 3

A formulation of 75% KT Mercer Clay, 15% Unimin Silverbond 325 Silica, and 10% Minspar 200 Feldspar is mixed, extruded, and kiln fired, and post-treated using the same equipment and procedure detailed in previous example #2. This finished refractory also exhibits similar characteristics:

```
Hunter Color L = 89.7
Hunter Color a = -0.2
Hunter Color b = 6.8
Solar Reflectance TSR = 0.838
Thermal Emittance = 0.90
Translucency = 0
Barrett Hardness = 87.0
Stain = 3
Porosity = 43.2%
```

```
XRF Analysis:

Al₂O₃ = 34.3%
SiO₂ = 62.0%
Fe₂O₃ = 0.4%
Other = 3.3%
Fibrous Minerals: None Detected
```

Example 4

A rotary pelletizer is charged with a mixture consisting of 62.5% KT Mercer Clay, 15% Unimin Silverbond 325 Silica, 10% Minspar 200 Feldspar, 10% Minex 4 Nephaline Syenite, and 2.5% TATA Sodium Carbonate. As the pelletizer rotates, a water spray is directed at the tumbling dry refractory mixture which subsequently forms small aggregates when the water droplets are absorbed. Further spraying causes the aggregates to grow larger in size. The "green" refractory aggregates are then screened through an 8 mesh Tyler sieve onto a 35 mesh Tyler sieve to isolate material of roofing granule size (i.e. No. 11). Both the +8 mesh oversize (broken up) and the -35 mesh undersize materials are returned to the pelletizer for recycle. The -8+35 mesh granules are then fired in a muffle furnace at 1250° C. for 2 hours. After cooling to room temperature, the resulting hyperbright white granules have a glossy glazed surface and show the following test results:

```
Hunter Color L = 88.4
Hunter Color a = -1.1
Hunter Color b = 10.0
Solar Reflectance TSR = 0.837
Thermal Emittance = 0.92
Translucency = 1
Barrett Hardness = 87.4
Stain = 0-1
Porosity = 38.6%
XRD Analysis:

Mullite = 34.7%
Quartz = 9.3%
Cristobalite = <0.5%>
Amorphous/Other = <55.5%>
XRF Analysis:

Al₂O₃ = 30.7%
SiO₂ == 62.9%
Fe₂O₃ = 0.3%
Other = 6.1%
Fibrous Minerals: None Detected
```

Example 5

A homogenous mixture of 74% Mercer Clay, 15% Unimin Silverbond 325 Silica, 10% Minex 4 Nephaline Syenite, and 1%> TATA Synthetic Light Sodium Carbonate is solidified in a FEECO continuous roll compactor at a roll speed of 5 rpm and 3060 psi compression. The product stream is -9+28 mesh aggregate with a 50% recycle rate. The obtained "green" granules are fired in a muffle furnace at 1250° C. for 2 hrs. The resulting hyperbright white granules show the following test results:

```
Hunter Color L = 88.4
Hunter Color a = -0.2
```

-continued

Hunter Color b = 8.5
Solar Reflectance TSR = 0.840
Thermal Emittance = 0.87
Translucency = 1
Barrett Hardness = 86.6
Stain = 3
Porosity = 32.9%
XRF Analysis:

$Al_2O_3$ = 37.9%
$SiO_2$ = 57.0%
$Fe_2O_3$ = 0.56%
Other = 4.5%
Fibrous Minerals: None Detected
XRD Analysis:

Mullite ≈ 40.2%
Quartz ≈ 7.0%
Cristobalite = 5.0%
Amorphous/Other = <47.4%

In all of these examples, the resulting refractories meet the targeted requirements of the critical performance parameters defined for hyperbright white roofing granules.

For reference, the "No. 11" grading mentioned in the foregoing examples refers to the most common granule particle size distribution used in the roofing industry. However, different manufacturers of roofing materials may refer to different granule particle size distributions as "No. 11." The grading of the granules is not directly related to the critical parameters of the hyperbright white roofing granules, but can affect the amount of substrate that is covered by the granules, and thus the total solar reflectance of the roofing material.

The embodiments presented herein are intended to be representative of the present invention and are in no way intended to limit the range of embodiments encompassed by the present disclosure. A person skilled in the relevant arts may make many variations and modifications of the refractories, roofing granules, roofing materials, manufacturing processes, and test methods discussed herein without departing from the spirit and scope of the invention, as defined by the claims presented below.

What is claimed is:

1. An article comprising:
   clay;
   crystalline silica particles,
       wherein the crystalline silica particles are present in an amount of 10 wt % to 40 wt % by weight of the article; and
   a sintering aid selected from calcium hydroxide, sodium bicarbonate, sodium carbonate, sodium silicate, feldspar, nepheline syenite, or any combination thereof;
   wherein the article comprises a plurality of light-scattering voids;
   wherein the article has a porosity of 30% to 50% when measured by mercury intrusion; and
   wherein the article is a white refractory roofing granule having a total solar reflectance of at least 0.8; and
   wherein the article, when tested without a colored coating, having:
   a Hunter Color L-value of at least 85,
   a Hunter Color a-value of less than 0.4, and
   a Hunter Color b-value of less than 11.

2. The article of claim 1, wherein the article has a total solar reflectance of from 0.8 to 0.845.

3. The article of claim 1, wherein the article has a Hunter Color L-value of 85 to 89.7.

4. The article of claim 1, wherein the article has a translucency of 5% or less, a Barrett Hardness value of at least 70, and a thermal emittance of at least 0.8.

5. The article of claim 1, wherein the article has a cristobalite content of less than 3%, a total iron content of less than 1%, and no detectable asbestiform minerals.

6. The article of claim 1, further comprising a coating selected from: a mixture comprising process oil and polysiloxane, aqueous polysiloxane, a polymer emulsion, or any combination thereof.

7. The article of claim 1, further comprising a composition comprising aluminum (III) oxide ($Al_2O_3$) in an amount of 20-50 wt % based on a total weight of the article.

8. The article of claim 1, wherein the article having an overall crystallinity of 30%-60%.

9. A process comprising:
   firing a mixture comprising a ceramic-forming clay, crystalline silica particles, and a sintering material, so as to form a white refractory roofing granule,
       wherein the white refractor roofing granule comprises a plurality of light-scattering voids;
       wherein the white refractory roofing granule has a porosity of 30% to 50% when measured by mercury intrusion;
       wherein the white refractory roofing granule has a total solar reflectance of at least 0.8;
       wherein the white refractory roofing granule, when tested without a colored coating, having:
       a Hunter Color L-value of at least 85,
       a Hunter Color a-value of less than 0.4, and
       a Hunter Color b-value of less than 11;
       wherein the crystalline silica particles are present in the white refractory roofing granule in an amount of 10 wt % to 40 wt % by weight of the white refractory roofing granule;
       wherein the sintering material comprises at least one of calcium hydroxide, sodium bicarbonate, sodium carbonate, sodium silicate, feldspar, nepheline syenite, or any combination thereof.

10. The process of claim 9, further comprising:
    forming the mixture, wherein the mixture comprises clay, the sintering material, and the crystalline silica particles;
    solidifying the mixture by compaction, extrusion, palletization, or any combination thereof;
    firing the mixture for a time and temperature sufficient to vitrify the sintering material but not the clay, to obtain a conglomerate;
    breaking the conglomerate into granules; and
    coating the granules with a post-treatment coating.

11. The process of claim 10, wherein the sintering material is selected from calcium hydroxide, sodium carbonate, sodium bicarbonate, sodium silicate, feldspar, nepheline syenite, or any combination thereof; and wherein the firing temperature is from 1000° C. to about 1400° C.

12. The process of claim 10, further comprising forming granules, wherein the granules are formed by pelletizing or by compaction and size reduction prior to firing.

13. The process of claim 10, wherein:
    the mixture of the forming step further comprises white pigment selected from titanium dioxide, magnesium oxide, barium sulfate, zinc oxide, or any combination thereof;
    the mixture of the forming step further comprises a filler selected from alumina, talc, gypsum, or any combination thereof; and the clay of the forming step is a white clay selected from kaolin, ball clay, montmorillonite, or any combination thereof.

14. The process of claim 10, wherein:

the mixture of the forming step is mixed with water to produce a homogeneous and uniformly dampened mass; and the homogeneous and uniformly dampened mass is subsequently extruded through a die or a screen to produce fragments or strips of green refractory material.

15. The process of claim 10, wherein the post-treatment coating is selected from: a mixture comprising process oil and polysiloxane aqueous polysiloxane, a polymer emulsion, or any combination thereof.

16. A roofing material comprising an article according to claim 1, and a base material comprising a nonwoven mat, wherein the nonwoven mat is coated with asphalt, impregnated with asphalt, or any combination thereof.

17. A method of reducing heat absorption of a roof, wherein the method comprises covering the roof with the roofing material of claim 16.

18. The article of claim 1, further comprising a white pigment selected from: titanium dioxide, magnesium oxide, barium sulfate, zinc oxide, or any combination thereof.

19. The article of claim 1, wherein the crystalline silica particles are quartz particles.

20. The article of claim 1, wherein
the Hunter Color L-value is 85 to 100,
the Hunter Color a-value is −1.5 to 0.3, and
the Hunter Color b-value is −5 to 10.

\* \* \* \* \*